(12) United States Patent
Irie et al.

(10) Patent No.: US 12,169,990 B2
(45) Date of Patent: Dec. 17, 2024

(54) GATE APPARATUS, GATE APPARATUS CONTROL METHOD, AND STORAGE MEDIUM

(71) Applicant: NEC Corporation, Tokyo (JP)

(72) Inventors: Fumi Irie, Tokyo (JP); Yoshitaka Yoshimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 53 days.

(21) Appl. No.: 17/796,997

(22) PCT Filed: Feb. 18, 2020

(86) PCT No.: PCT/JP2020/006217
§ 371 (c)(1),
(2) Date: Aug. 2, 2022

(87) PCT Pub. No.: WO2021/166065
PCT Pub. Date: Aug. 26, 2021

(65) Prior Publication Data
US 2023/0060106 A1    Feb. 23, 2023

(51) Int. Cl.
*G07C 9/25* (2020.01)
*G06V 40/12* (2022.01)
*G06V 40/16* (2022.01)
*G07C 9/10* (2020.01)

(52) U.S. Cl.
CPC .......... *G07C 9/25* (2020.01); *G06V 40/1365* (2022.01); *G06V 40/172* (2022.01); *G07C 9/10* (2020.01)

(58) Field of Classification Search
None
See application file for complete search history.

(56) References Cited

U.S. PATENT DOCUMENTS

| | | |
|---|---|---|
| 7,118,027 B2 * | 10/2006 | Sussman .............. G06Q 20/341 235/382 |
| 8,074,878 B1 * | 12/2011 | Daniel ............. G06K 19/07372 235/492 |
| 11,288,904 B2 * | 3/2022 | Kunieda .................. G07C 9/37 |

(Continued)

FOREIGN PATENT DOCUMENTS

| EP | 4089254 A1 | 11/2022 |
|---|---|---|
| JP | 2003-196428 A | 7/2003 |

(Continued)

OTHER PUBLICATIONS

Extended European Search Report for EP Application No. 20919651.8, dated on Feb. 24, 2023.

(Continued)

*Primary Examiner* — Muhammad Adnan

(57) ABSTRACT

A gate apparatus includes a determination unit, a fingerprint authentication unit, and a gate control unit. The determination unit determines a nationality of an examination target user. The fingerprint authentication unit obtains a fingerprint of the examination target user if the nationality of the examination target user is a first country and performs fingerprint authentication using the obtained fingerprint. The gate control unit controls a gate to allow the examination target user of the first nationality to pass through if the fingerprint authentication of the examination target user is successful.

13 Claims, 11 Drawing Sheets

(56) References Cited

U.S. PATENT DOCUMENTS

| | | | |
|---|---|---|---|
| 11,450,164 B2* | 9/2022 | Jobling | H04W 12/63 |
| 2003/0136850 A1* | 7/2003 | Yamagishi | G07F 7/1008 |
| | | | 235/492 |
| 2008/0168062 A1* | 7/2008 | Reeves | G07C 9/257 |
| | | | 707/999.009 |
| 2010/0308108 A1* | 12/2010 | Choi | G07C 9/10 |
| | | | 235/382 |
| 2014/0257996 A1* | 9/2014 | Kim | G06Q 20/26 |
| | | | 705/40 |
| 2017/0345235 A1 | 11/2017 | Touret et al. | |
| 2018/0018838 A1* | 1/2018 | Fankhauser | G07C 9/257 |
| 2018/0121834 A1* | 5/2018 | Wong | G06Q 10/02 |
| 2019/0206171 A1* | 7/2019 | Sasaki | G07C 9/00563 |
| 2019/0279446 A1* | 9/2019 | Kunieda | H04N 7/183 |
| 2019/0295341 A1* | 9/2019 | Inoe | G07C 9/15 |
| 2019/0385395 A1* | 12/2019 | Kunieda | G07C 9/15 |
| 2020/0118368 A1* | 4/2020 | Tagawa | G07C 9/257 |
| 2020/0211309 A1* | 7/2020 | Daniel | G07C 9/257 |
| 2021/0312201 A1* | 10/2021 | Hastings | G06V 20/52 |

FOREIGN PATENT DOCUMENTS

| | | |
|---|---|---|
| JP | 2019-071126 A | 5/2019 |
| WO | 2019/147120 A1 | 8/2019 |
| WO | 2020/026368 A1 | 2/2020 |
| WO | 2021/166065 A1 | 8/2021 |

OTHER PUBLICATIONS

International Search Report for PCT Application No. PCT/JP2020/006217, mailed on May 12, 2020.
Written opinion for PCT Application No. PCT/JP2020/006217, mailed on May 12, 2020.
Measures for Safety of IC Passports described in https://www.mofa.go.jp/mofaj/toko/passport/ic_faq.html#11.
JP Office Action for JP Application No. 2023-104929, mailed on Apr. 24, 2024 with English Translation.

* cited by examiner

FIG. 4

GATE USER DATABASE

| BIOLOGICAL INFORMATION | MRZ INFORMATION |
|---|---|
| FV1 | MRZ01 |
| FV2 | MRZ02 |
| FV3 | MRZ03 |
| ... | ... |

FIG. 8

MATCHING REQUEST

| GATE IDENTIFIER | FEATURE VECTOR | ... |

FIG. 9

PLACE YOUR BOTH HANDS ON A FINGERPRINT SCANNER FOR COLLECTING OF YOUR FINGERPRINTS.

GATE APPARATUS, GATE APPARATUS CONTROL METHOD, AND STORAGE MEDIUM

This application is a National Stage Entry of PCT/JP2020/006217 filed on Feb. 18, 2020, the contents of all of which are incorporated herein by reference, in their entirety.

TECHNICAL FIELD

The present invention relates to a gate apparatus, a gate apparatus control method, and a storage medium.

BACKGROUND ART

Immigration examination is performed at airports. An officer in charge of the immigration examination compares a photograph of a face attached to a passport and a face of a person in front of the officer. If the face image in the passport does not match the face of the person in front of the officer, immigration of the person is not permitted.

In addition, in recent years, apparatuses that automatically perform the above immigration examination have been introduced. For example, a gate apparatus disclosed in PTL 1 performs matching between a face image attached to a passport and a face image of a person standing in front of the gate apparatus and examines the emigration and immigration of the person based on a result of the matching.

CITATION LIST

Patent Literature

[PTL 1] Japanese Unexamined Patent Application Publication No. 2019-071126

SUMMARY OF INVENTION

Technical Problem

Immigration examinations in Japan differ depending on a nationality of a person to be examined. Specifically, fingerprints are not required at immigration checkpoints for persons of Japanese nationality (Japanese). In contrast, fingerprints are required at immigration checkpoints for persons of foreign nationality (foreigners).

In this way, the immigration examination process differs depending on the nationality of the person to be examined. Naturally, the apparatus that automatically performs the immigration examination (hereinafter referred to as an "automatic immigration examination apparatus") is required also to be compatible with the above differences in examination contents. Therefore, it is necessary that the automatic immigration apparatus for Japanese and the automatic immigration apparatus for foreigners are installed in immigration area. However, such a setting is not acceptable in immigration examination area where space is limited.

The present invention contributes to realization of automatic emigration and immigration examination with a single apparatus regardless of nationality of an examination target user, and it is a principal object of the present invention to provide a gate apparatus, a gate apparatus control method, and a storage medium.

Solution to Problem

According to a first aspect of the present invention, there is provided a gate apparatus, including: a determination unit that determines a nationality of an examination target user: a fingerprint authentication unit that obtains a fingerprint of the examination target user if the nationality of the examination target user is a first country, and performs fingerprint authentication using the obtained fingerprint; and a gate control unit that controls a gate to allow the examination target user of a first nationality to pass through if the fingerprint authentication of the examination target user is successful.

According to a second aspect of the present invention, there is provided a gate apparatus control method, including: determining a nationality of an examination target user: obtaining a fingerprint of the examination target user if the nationality of the examination target user is a first country: performing fingerprint authentication using the obtained fingerprint; and controlling a gate to allow the examination target user of a first nationality to pass through if the fingerprint authentication of the examination target user is successful.

According to a third aspect of the present invention, there is provided a computer-readable storage medium, storing a program that causes a computer mounted on a gate apparatus to perform processing for: determining a nationality of an examination target user: obtaining a fingerprint of the examination target user if the nationality of the examination target user is a first country: performing fingerprint authentication using the obtained fingerprint; and controlling a gate to allow the examination target user of a first nationality to pass through if the fingerprint authentication of the examination target user is successful.

Advantageous Effects of Invention

According to the individual aspects of the present invention, there are provided a gate apparatus, a gate apparatus control method, and a storage medium that contribute to realization of automatic emigration and immigration examination with a single apparatus regardless of a nationality of an examination target user. The advantageous effects of the present invention are not limited to the above advantageous effect. The present invention may provide other advantageous effects, instead of or in addition to the above advantageous effect.

BRIEF DESCRIPTION OF THE DRAWINGS

FIG. 4 is a diagram illustrating an example of a gate user database.

FIG. 8 is a diagram illustrating an example of a matching request.

FIG. 9 is a diagram illustrating an operation of a fingerprint authentication unit according to the first example embodiment.

EXAMPLE EMBODIMENT

Figure 1:
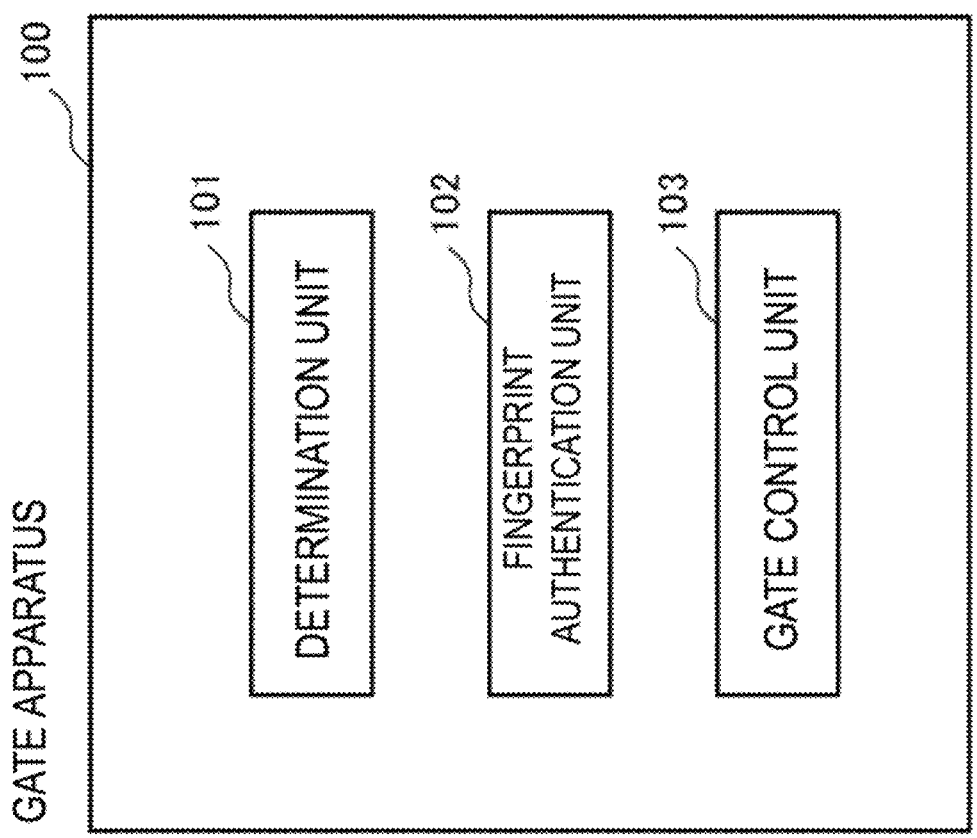
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

A gate apparatus 100 according to an example embodiment includes a determination unit 101, a fingerprint authentication unit 102, and a gate control unit 103 (see FIG. 1). The determination unit 101 determines a nationality of an examination target user. The fingerprint authentication unit 102 obtains a fingerprint of the examination target user if the nationality of the examination target user is a first country (for example, countries other than Japan), and performs fingerprint authentication using the obtained fingerprint. The gate control unit 103 controls a gate to allow the examination target user of a first nationality to pass through if the fingerprint authentication of the examination target user is successful.

The gate apparatus 100, for example, determines a nationality of a user based on a pre-registered MRZ information of the user. The gate apparatus 100, for example, if the examination target user is a foreigner with a correct passport, completes immigration examination and opens the gate after successfully authenticating a fingerprint of the user. In contrast, if, for example, the nationality of the examination target user is a second country (for example, Japan), the gate apparatus 100 completes the immigration examination on the condition that it is confirmed that the examination target user possesses a correct passport and opens the gate. In this way, one gate apparatus 100 can complete the immigration examination of a user regardless of the user's nationality.

Hereinafter, specific example embodiments will be described in more detail with reference to drawings.

First Example Embodiment

A first example embodiment will be described in more detail with reference to drawings.

Figure 2:
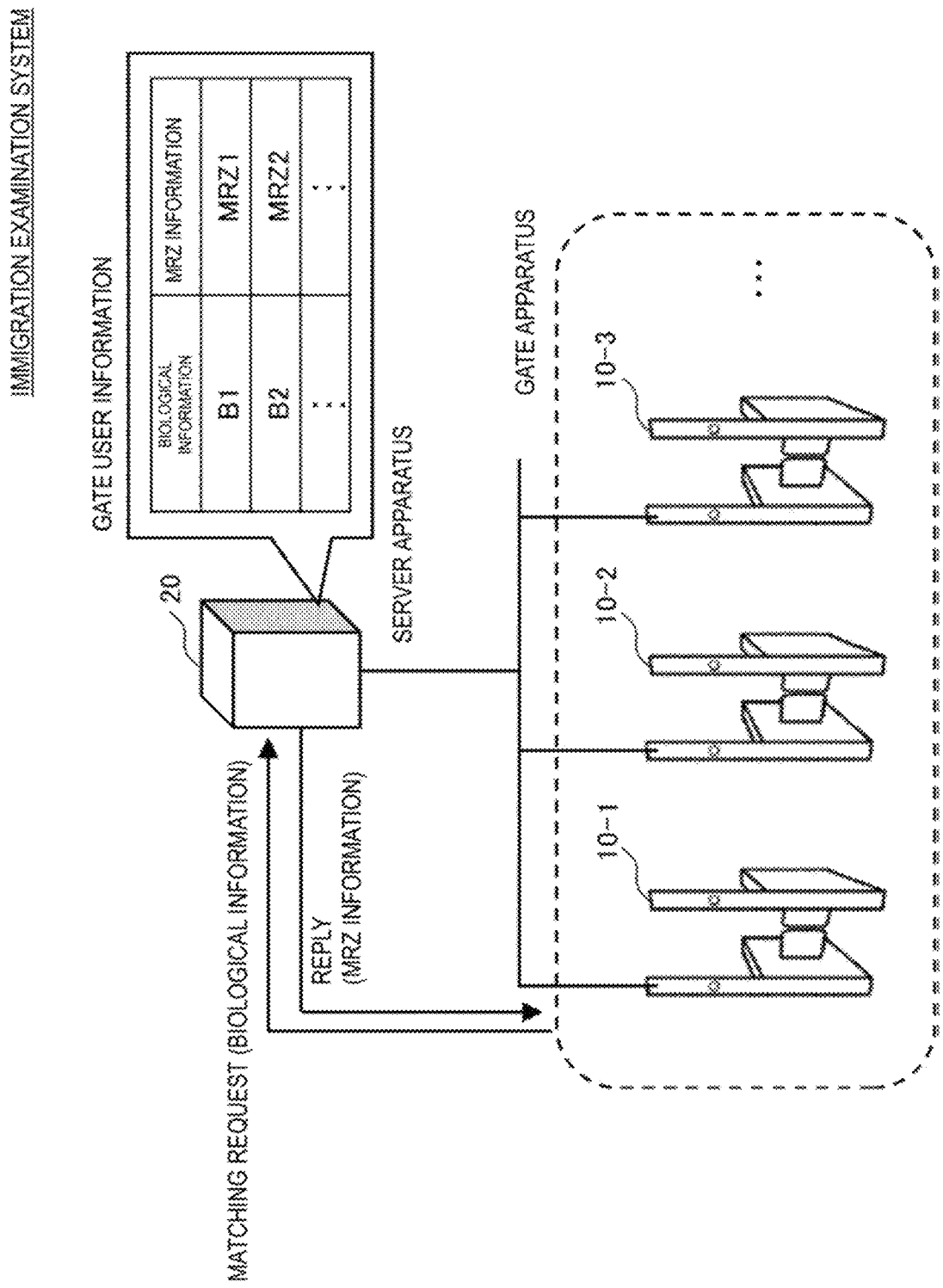
FIG. 2 is a diagram illustrating an example of a schematic configuration of an immigration examination system according to a first example embodiment.

FIG. 2 is a diagram illustrating an example of a schematic configuration of an immigration examination system according to the first example embodiment. As illustrated in FIG. 2, the immigration examination system includes a plurality of gate apparatuses 10-1 to 10-3 and a server apparatus 20. In the following description, unless there is a particular reason to distinguish the gate apparatuses 10-1 to 10-3 from each other, any one of these gate apparatuses 10-1 to 10-3 will simply be referred to as a "gate apparatus 10". In addition, while three gate apparatuses 10 are illustrated in FIG. 2, the number of gate apparatuses 10 included in the system is not of course limited to any particular number. The immigration examination system includes at least one gate apparatus 10.

The individual gate apparatus 10 is an apparatus that automatically performs an emigration and immigration examination procedure for users. The gate apparatus 10 includes a gate that can be opened and closed. If the gate apparatus 10 determines that a person located in front of the gate apparatus 10 passes an immigration examination, the gate apparatus 10 opens the gate and permits the user to pass through the gate. In this way, the gate apparatus 10 controls the gate based on a result of the immigration examination of the user.

The server apparatus 20 is an apparatus that realizes the emigration and immigration examination based on the above gate apparatus 10. For example, the server apparatus 20 stores information about users who can use the gate apparatus 10 (the information will hereinafter be referred to as gate user information). Specifically, the server apparatus 20 stores biological information about users and information written in Machine Readable Zones (MRZs) in passports issued to the users (the information will hereinafter be referred to as MRZ information) in association with each other.

For example, the biological information about a user is data (feature values) calculated from physical features unique to this individual user. The physical features are about a face, a fingerprint, a voiceprint, a vein, a retina, or an iris pattern of an eye of the user. Alternatively, the biological information about a user may be, for example, image data of a face image or a fingerprint image of the user. Any information including physical features of a user may be used as the biological information about the user.

The information (MRZ information) written in an MRZ in a passport includes the name, the nationality, the gender, the date of birth of the user, the passport number, the validity period, etc.

The gate apparatuses 10 and the server apparatus 20 can communicate with each other via wired or wireless communication means. The server apparatus 20 may be placed in the same airport where the gate apparatuses 10 are placed. Alternatively, the server apparatus 20 may be placed on a network (cloud).

[Operation in Immigration Examination System]

Next, a schematic operation in the immigration examination system according to the first example embodiment will be described with reference to FIG. 2.

The gate user information about a user of the immigration examination system is registered in the server apparatus 20, for example, before departure of the user. That is, the gate user information about a user is registered in the server apparatus 20 before his or her departure date or before departure on his or her departure date. The server apparatus 20 includes a database for storing the gate user information, and after a user registers his or her gate user information, an entry corresponding to this user is added in the database. Hereinafter, the database for storing the gate user information will be referred to as a "gate user database". In the gate user database, biological information about at least one user and MRZ information written in a machine-readable zone in the passport issued to the at least one user are stored in association with each other.

A user visits a departure airport on the departure date. After the user completes boarding procedures such as a check-in procedure and a security check procedure, the user boards an aircraft. When the aircraft carrying the user arrives at an arrival airport (the airport where the gate apparatus 10 is installed), the user moves to an area where the gate apparatus 10 is installed (immigration examination checkpoint).

When the user arrives at an immigration examination area, the user moves to the gate apparatus 10.

When the user comes close to the gate apparatus 10 (when the distance between the user and the gate apparatus 10 reaches a predetermined distance or less), the gate apparatus 10 acquires (generates) biological information from the user. The biological information acquired by the gate apparatus 10 is the same kind of information as the biological information registered as the gate user information in the server apparatus 20.

The gate apparatus 10 transmits the acquired biological information to the server apparatus 20. More specifically, the gate apparatus 10 transmits a "matching request" including the acquired biological information to the server apparatus 20.

The server apparatus 20 searches the gate user database by using the received biological information as a key and determines the MRZ information corresponding to the received biological information. The server apparatus 20 transmits a reply (a reply to the matching request) including the determined MRZ information to the gate apparatus 10.

The gate apparatus 10 determines a nationality of an examination target user based on the MRZ information acquired. As described above, the MRZ information includes a nationality of a passport holder. Therefore, the gate apparatus 10 can know the nationality of the user from the MRZ information.

When the user arrives at the gate apparatus 10, the user holds his or her passport on a reader (a reader 316 to be described below) of the gate apparatus 10 (brings his or her passport into contact with the reader). That is, the user brings his or her passport into contact with the reader of the gate apparatus 10 in the same way as people bring their transportation IC (Integrated Circuit) cards into contact with card readers at ticket gates in stations.

The gate apparatus 10 attempts to read out information written in an IC chip in the passport via the reader. If the gate apparatus 10 succeeds in reading out the information written in the IC chip, the gate apparatus 10 determines that the user possesses a correct passport.

The gate apparatus 10 opens the gate if the user is Japanese (the nationality of the user is Japanese) and the user possesses the correct passport.

If the user is a foreigner (the nationality of the user is other than Japanese), the gate apparatus 10 instructs the user to place both hands on a fingerprint scanner. For example, the gate apparatus 10 may display the above instructions on an LCD monitor or other device, or the gate apparatus may provide audio notification of the above instructions.

The gate apparatus 10 attempts to collect a fingerprint using the fingerprint scanner. The gate apparatus 10 performs a matching process using the collected fingerprint. If the gate apparatus 10 succeeds in matching with fingerprint and the user (the foreign user) possesses the correct passport, the gate apparatus 10 opens the gate.

The user passes through the gate, and the immigration examination ends.

In this way, in the immigration examination system according to the first example embodiment, the gate user information is registered in advance in the server apparatus 20. The MRZ information of the registered gate user information is used to determine the nationality of the user. The gate apparatus 10 decides whether or not to take a fingerprint based on the nationality of the user.

Next, the individual apparatuses included in the immigration examination system according to the first example embodiment will be described in detail. The following description will be made based on an example in which information about faces of people are used as the biological information registered in the server apparatus 20.

[Server Apparatus]

Figure 3:
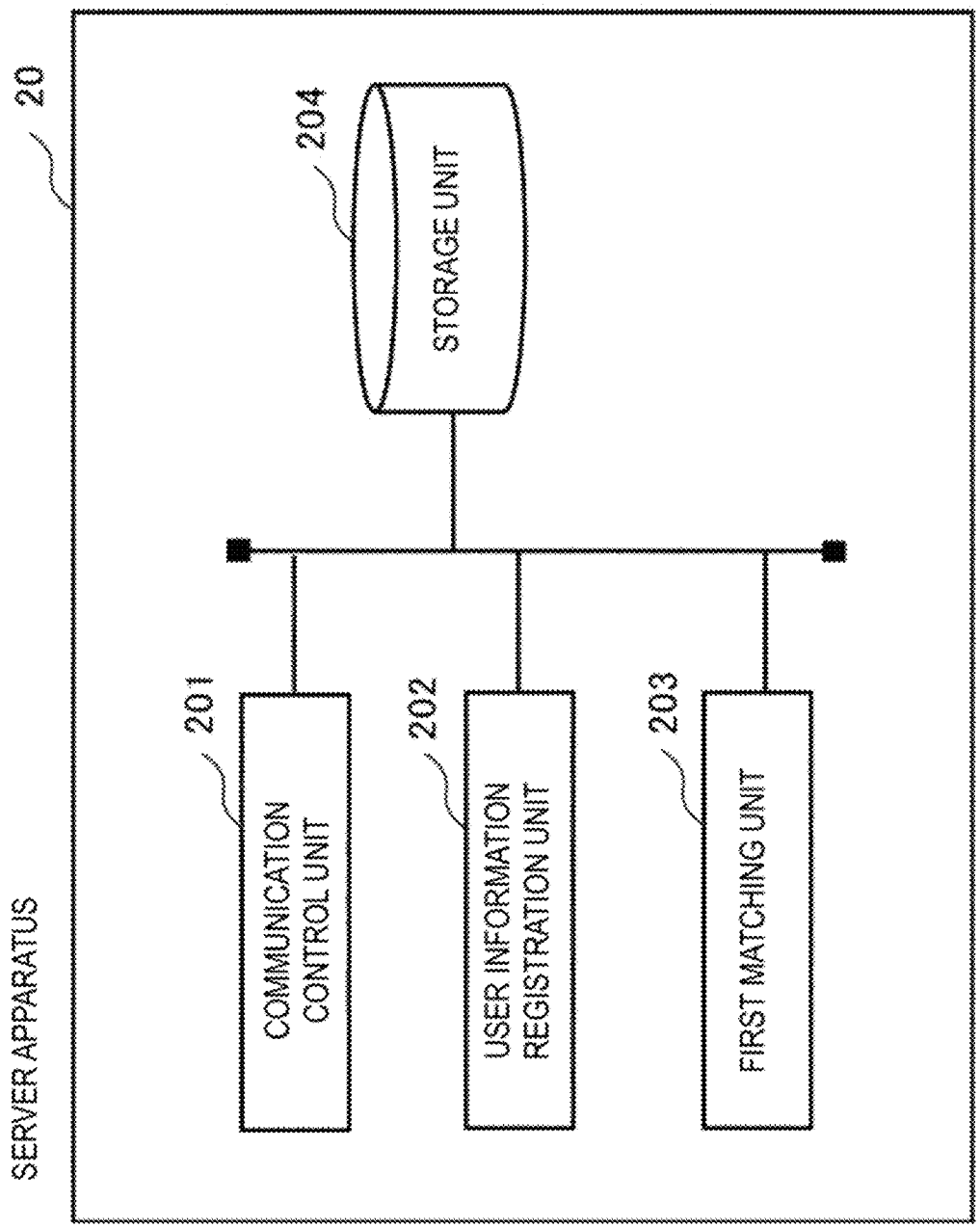
FIG. 3 is a diagram illustrating an example of a processing configuration of a server apparatus according to the first example embodiment.

FIG. 3 is a diagram for illustrating an example of a processing configuration (processing modules) of the server apparatus 20 according to the first example embodiment. As illustrated in FIG. 3, the server apparatus 20 includes a communication control unit 201, a user information registration unit 202, a first matching unit 203, and a storage unit 204.

The communication control unit 201 is means for controlling communication with other apparatuses. Specifically, the communication control unit 201 receives data (packets) from the gate apparatuses 10. In addition, the communication control unit 201 transmits data to the gate apparatuses 10.

The user information registration unit 202 is means for acquiring gate user information and registering the acquired gate user information in the gate user database established in the storage unit 204. The user information registration unit 202 can use any method to acquire the gate user information.

For example, an officer in charge at a passport center may register gate user information in the server apparatus 20. Specifically, an officer in charge operates a scanner and reads out a photograph of a face and a page including an MRZ in a passport. The officer in charge operates a terminal (a computer installed at the passport center) and transmits the read data (image data) to the server apparatus 20. Alternatively, the above data may be input to the server apparatus 20 via an external storage device, such as a USB (Universal Serial Bus) memory.

The above data (image data including the photograph of the face and the MRZ) may be input to the server apparatus 20 during a check-in procedure at the airport. Specifically, when an airline company staff member checks the passport of the user, the staff member reads out the photograph of the face and the page including the MRZ by using a scanner. The airline company staff member may transmit the read data from a terminal to the server apparatus 20.

Alternatively, the user may use a so-called automatic check-in machine, to read the photograph of the face and the page including the MRZ by himself or herself. In this case, the data read from the automatic check-in machine is transmitted to the server apparatus 20.

The user may capture the photograph of the face and the page including the MRZ in the passport, to acquire image data including the photograph of the face and the MRZ. Specifically, the user uses a smartphone or the like to capture the photograph of the face and the page including the MRZ in the passport. Next, the captured image data is transmitted from the smartphone or the like to the server apparatus 20.

Alternatively, the image data including the photograph of the face and the MRZ may be acquired from a database in which records of the users who have been abroad are stored. Specifically, if the photograph of the face and the MRZ have previously been acquired at a staffed emigration and immigration booth and registered in a database, the corresponding image data may be transmitted from the database to the server apparatus 20.

The user information registration unit 202 may use any one of the above-described methods or a different method, to acquire the image data including the photograph of the face and the MRZ included in the passport of the user.

The user information registration unit 202 extracts feature points from the face image included in the acquired image data. Since an existing technique can be used to extract these feature points, detailed description of the extraction will be omitted. For example, the user information registration unit 202 extracts the eyes, nose, mouth, etc. as feature points from the face image. Next, the user information registration unit 202 calculates, as feature values, the location of the individual feature point and the distance between feature points and generates a feature vector formed by a plurality of feature values (vector information that features the face image).

The user information registration unit 202 extracts the MRZ information from the image data including the MRZ information. Specifically, the user information registration unit 202 uses an optical character recognition (OCR) technique to extract the MRZ information from the image data.

The user information registration unit 202 associates the generated feature vector and the extracted MRZ information with each other and registers the associated information in the gate user database.

FIG. 4 is a diagram illustrating an example of the gate user database. As illustrated in FIG. 4, the feature vectors generated from face images are registered as biological information. In addition, MRZ information corresponding to the individual biological information (feature vectors) is registered in the gate user database.

The first matching unit 203 is means for processing matching requests transmitted by the gate apparatuses 10. Specifically, the first matching unit 203 sets the biological information (the feature vector) included in a matching request as the matching target and performs matching processing between this biological information and the biological information registered in the gate user database.

More specifically, the first matching unit 203 sets a feature vector extracted from a matching request as the matching target and performs 1-to-N matching (N will hereinafter represent a positive integer) between this feature vector and the plurality of feature vectors registered in the gate user database.

The first matching unit 203 calculates a similarity between the feature vector as the matching target and each of the plurality of feature vectors registered. For this similarity, the chi-squared distance, the Euclidean distance, or the like may be used. A large distance represents a lower similarity, and a smaller distance represents a higher similarity.

The first matching unit 203 searches the plurality of feature vectors registered in the gate user database for a feature vector whose similarity to the matching target feature vector is more than or equal to a predetermined value and whose similarity is the highest.

The first matching unit 203 reads out the MRZ information corresponding to the feature vector (biological information) obtained as a result of the 1-to-N matching from the gate user database. The first matching unit 203 transmits the read MRZ information to the gate apparatus 10 that has transmitted the matching request (replies to the matching request).

For example, in the example in FIG. 4, if the similarity between a feature vector FV acquired from a gate apparatus 10 and a feature vector FV1 stored in the gate user database is the highest, MRZ01 corresponding to this feature vector FV1 is transmitted to the gate apparatus 10.

If, as the result of the above 1-to-N matching, the biological information that matches the biological information included in the matching request is not registered in the gate user database, the first matching unit 203 notifies the gate apparatus 10 to that effect. For example, the first matching unit 203 sets "None" and transmits a reply to the gate apparatus 10.

Alternatively, the first matching unit 203 may notify the gate apparatus 10 that the biological information included in the matching request is not included in the gate user database by not transmitting any reply to the gate apparatus 10. In this case, the gate apparatus 10 that has transmitted the matching request recognizes that the biological information included in the matching request is not included in the gate user database by not receiving any reply from the server apparatus 20 within a predetermined period.

The storage unit 204 stores various kinds of information necessary for operations of the server apparatus 20. In addition, as described above, the gate user database is established in the storage unit 204.

Figure 5:
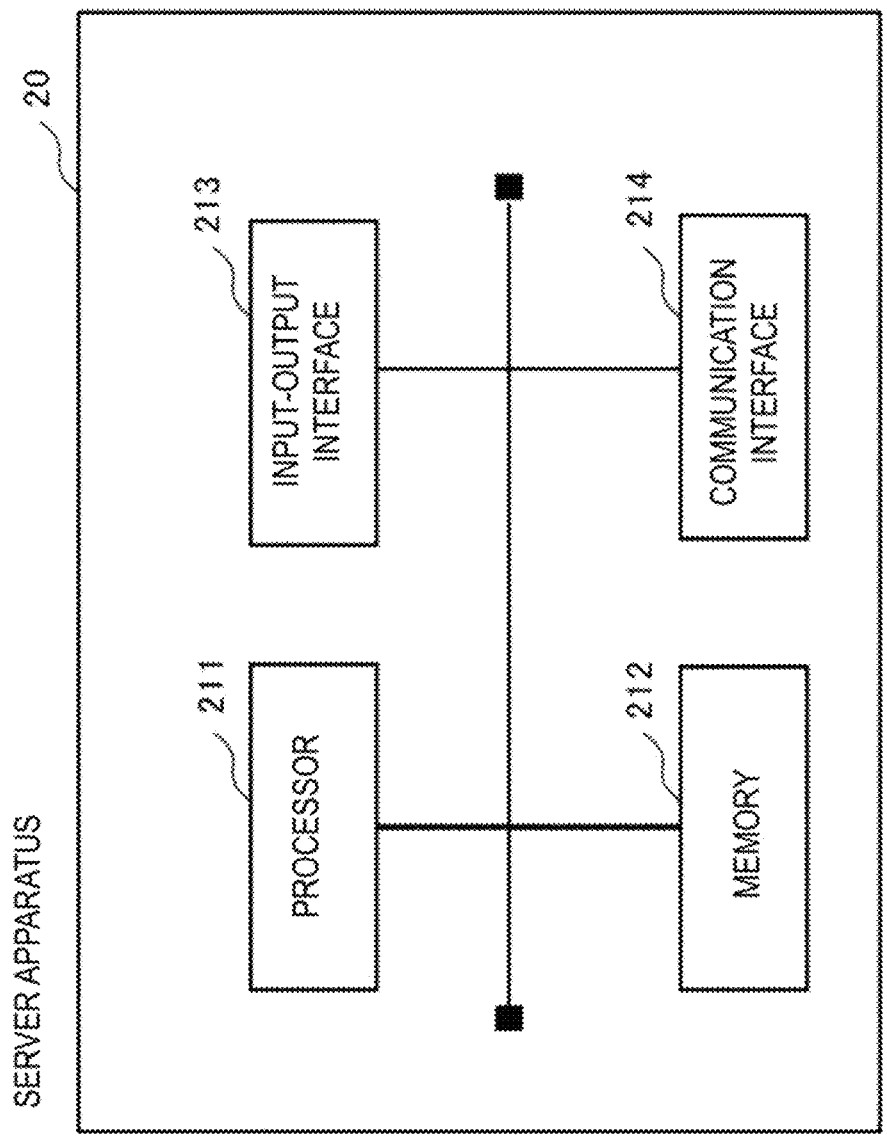
FIG. 5 is a diagram illustrating an example of a hardware configuration of the server apparatus according to the first example embodiment.

FIG. 5 is a diagram illustrating an example of a hardware configuration of the server apparatus 20 according to the first example embodiment. The server apparatus 20 can be configured by an information processing apparatus (a so-called computer) and has a configuration illustrated as an example in FIG. 5. For example, the server apparatus 20 includes a processor 211, a memory 212, an input-output interface 213, a communication interface 214, etc. The components such as the processor 211 are connected to an internal bus, etc. so that these components can communicate with each other.

The hardware configuration of the server apparatus 20 is not limited to the configuration illustrated in FIG. 5. The server apparatus 20 may include hardware not illustrated or may be configured without the input-output interface 213 if desired. In addition, the number of components, such as the number of processors 211, included in the server apparatus 20 is not limited to the example illustrated in FIG. 5. For example, a plurality of processors 211 may be included in the server apparatus 20.

For example, the processor 211 is a programmable device such as a CPU (Central Processing Unit), an MPU (Micro Processing Unit), or a DSP (Digital Signal Processor). Alternatively, the processor 211 may be a device such as an FPGA (Field Programmable Gate Array) or an ASIC (Application Specific Integrated Circuit). The processor 211 executes various kinds of programs including an operating system (OS).

The memory 212 is a RAM (Random Access Memory), a ROM (Read-Only Memory), an HDD (Hard Disk Drive), an SSD (Solid State Drive), or the like. The memory 212 stores an OS program, an application program, and various kinds of data.

The input-output interface 213 is an interface for a display apparatus and an input apparatus not illustrated. For example, the display apparatus is a liquid crystal display or the like. For example, the input apparatus is an apparatus, such as a keyboard or a mouse, which receives user operations.

The communication interface 214 is a circuit, a module, or the like for performing communication with other apparatuses. For example, the communication interface 214 includes a NIC (Network Interface Card) or the like.

The function of the server apparatus 20 is realized by various kinds of processing modules. The processing modules are realized, for example, by causing the processor 211 to execute a program stored in the memory 212. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

[Gate Apparatus]

Next, the gate apparatus 10 according to the first example embodiment will be described.

Figure 6:
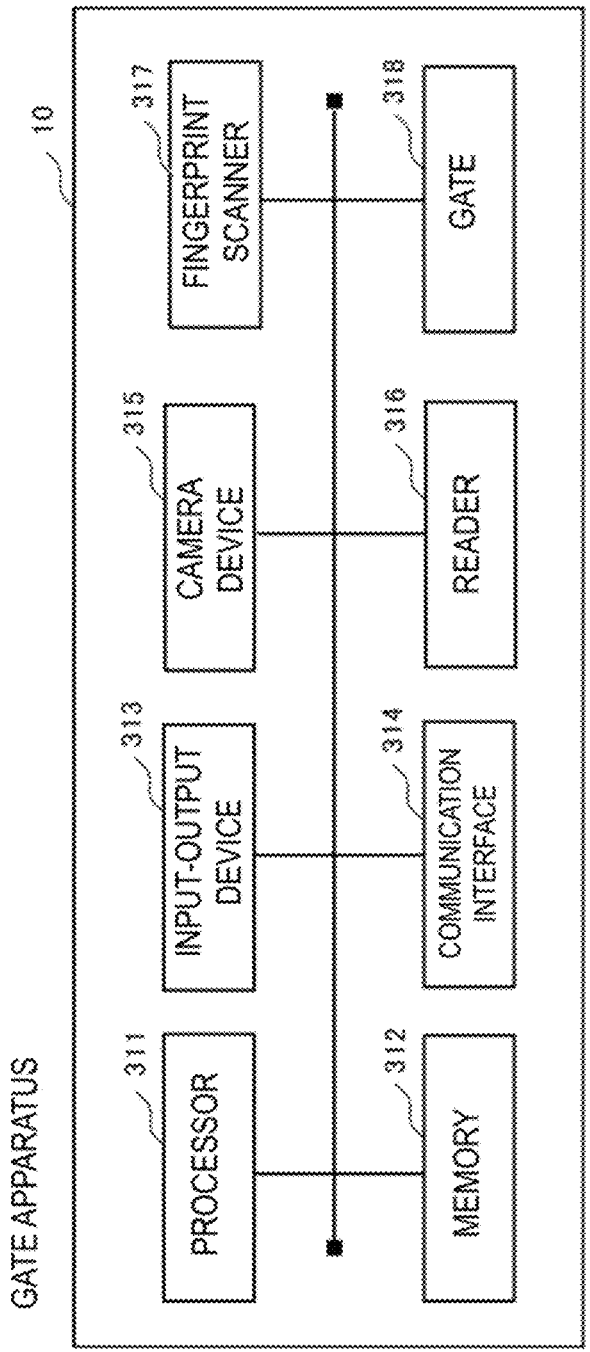
FIG. 6 is a diagram illustrating an example of a hardware configuration of the gate apparatus according to the first example embodiment.

FIG. 6 is a diagram illustrating an example of a hardware configuration of the gate apparatus 10 according to the first example embodiment. As illustrated in FIG. 6, the gate apparatus 10 includes a processor 311, a memory 312, an input-output device 313, a communication interface 314, a camera device 315, a reader 316, a fingerprint scanner 317, and a gate 318.

Since the processor 311, the memory 312, and the communication interface 314 may be equivalent to those of the server apparatus 20 described with reference to FIG. 5, detailed description thereof will be omitted.

The input-output device 313 serves as a device (for example, a touch panel) for inputting information to the gate apparatus 10 and a device (for example, a liquid crystal monitor) for outputting information.

For example, the camera device 315 is a digital camera installed to capture an image of a person in the forward direction of the gate apparatus 10. The camera device 315 may be installed at any location. For example, the camera device 315 may be installed on the main body of the gate apparatus 10 or away from the gate apparatus 10. As long as the camera device 315 can capture an image of a user approaching the gate apparatus 10 (in particular, the face of the user), the camera device 315 may be installed at any location.

The reader 316 is a device that reads out information from passports. The reader 316 has a function of accessing IC chips in passports and a function of scanning pages of passports placed. That is, the reader 316 has a function as a card reader that exchanges information (data) with IC chips in passports in a non-contact state and has a function as a passport reader (a scanner) that acquires images from passports. The reader 316 may be installed at any location. However, it is preferable that the reader 316 be installed at a location where users can easily bring their passports into contact with this reader 316. While the present application will be described assuming that the reader 316 has a function as a card reader and a function as a passport reader, these two functions may be of course realized by different devices.

The fingerprint scanner 317 is a device for acquiring a fingerprint of a person. The fingerprint scanner 317 can collect fingerprints from up to 10 fingers.

When a user passes the immigration examination, the gate 318 shifts from a closed state in which the gate 318 blocks passage of the user to an opened state in which passage of the user is permitted. The mechanism of the gate 318 is not limited to any particular mechanism. For example, the gate 318 is a flap gate that opens and closes a flap installed on one side or flaps installed on both sides of the passage or is a turnstile gate that rotates three bars.

Figure 7:
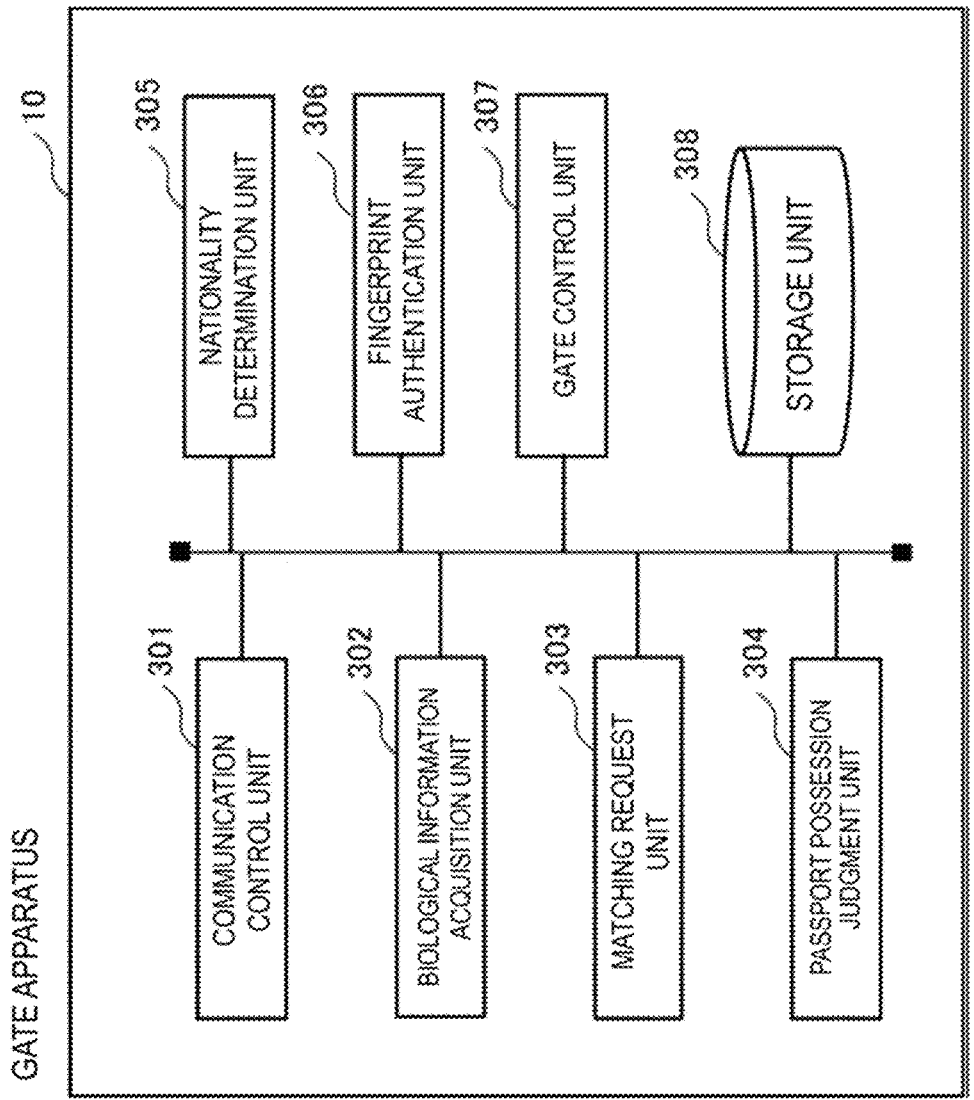
FIG. 7 is a diagram illustrating an example of a processing configuration of the gate apparatus according to the first example embodiment.

FIG. 7 is a diagram illustrating an example of a processing configuration (processing modules) of the gate apparatus 10 according to the first example embodiment. As illustrated in FIG. 7, the gate apparatus 10 includes a communication control unit 301, a biological information acquisition unit 302, a matching request unit 303, a passport possession judgment unit 304, a nationality determination unit 305, a fingerprint authentication unit 306, a gate control unit 307, and a storage unit 308.

As with the communication control unit 201 of the server apparatus 20, the communication control unit 301 is means for controlling communication with other apparatuses.

The biological information acquisition unit 302 is means for acquiring biological information about users who wish to pass through the gate apparatus 10. For example, the biological information acquisition unit 302 controls the camera device 315 and acquires a face image of a person walking toward the camera device 315 (the gate apparatus 10). For example, when the biological information acquisition unit 302 detects a user's face in an image being constantly or regularly captured, the biological information acquisition unit 302 captures the user's face and acquires the image of the face.

If the size of the face area included in the captured image is more than or equal to a predetermined value, the biological information acquisition unit 302 may extract the face area from the image. In this case, by appropriately adjusting the predetermined value (a threshold), the biological information acquisition unit 302 can acquire the face image of the user at a location a predetermined distance away from the gate apparatus 10. That is, it is possible to prevent capturing an image of the user at a location far away from the gate apparatus 10 and prevent transmitting biological information inappropriate for face authentication (1-to-1 matching by the server apparatus 20) to the server apparatus 20.

Alternatively, the biological information acquisition unit 302 may measure the distance between the gate apparatus 10 and a user by using a distance sensor or the like and may acquire a face image of a user at a predetermined location.

The biological information acquisition unit 302 gives the acquired face image to the matching request unit 303.

The matching request unit 303 is means for requesting the server apparatus 20 to perform matching to determine whether the biological information about the person corresponding to the acquired face image is registered in the gate user database. Specifically, the matching request unit 303 calculates feature values from the acquire face image and generates a feature vector from the plurality of feature values (generates a feature vector corresponding to the biological information registered in the server apparatus 20).

The matching request unit 303 generates a matching request including the generated feature vector (biological information) and transmits the generated matching request to the server apparatus 20 via the communication control unit 301.

For example, the matching request unit 303 generates a matching request including an identifier of the corresponding gate apparatus 10 (hereinafter referred to as a gate identifier), a feature vector, etc. (see FIG. 8). A MAC (Media Access Control) address or an IP (Internet Protocol) address of the gate apparatus 10 may be used as the gate identifier.

The matching request unit 303 receives a reply to the matching request from the server apparatus 20 via the communication control unit 301. The matching request unit 303 gives the reply (MRZ information corresponding to the feature vector determined by the 1-to-N matching) from the server apparatus 20 to the nationality determination unit 305.

The passport possession judgment unit 304 is means for determining whether the user who wishes to pass through the gate apparatus 10 possesses a correct passport. Specifically, the passport possession judgment unit 304 attempts to read out information from an IC chip in the passport held over the reader 316 by using the MRZ information acquired from the matching request unit 303.

As described in "Measures for Safety of IC Passports" in the following reference document 1, information stored in an IC chip in a passport is encrypted (converted) by using MRZ information written in the same passport as a password.

Reference Document 1 https://www.mofa.go.jp/mofaj/toko/passport/ic_faq.html#11

If the passport possession judgment unit 304 succeeds in reading out information from the IC chip by using the MRZ information acquired from the server apparatus 20 (succeeds in decrypting the information), the passport possession judgment unit 304 determines that the user who wishes to pass through the gate apparatus 10 possesses a correct passport.

In contrast, if the passport possession judgment unit 304 fails to read out information from the IC chip by using the acquired MRZ information from the server apparatus 20, the passport possession judgment unit 304 determines that the user who wishes to pass through the gate apparatus 10 does not possess a correct passport.

In this way, if the passport possession judgment unit 304 succeeds in reading out information from the IC chip by using the MRZ information (succeeds in decrypting the encrypted information), the passport possession judgment unit 304 determines that the user possesses a correct passport. Thus, the passport possession judgment unit 304 may check or may not check the content of the information read out from the IC chip.

If the passport possession judgment unit 304 determines that the user who wishes to pass through the gate apparatus 10 possesses a correct passport, the passport possession judgment unit 304 notifies the gate control unit 307 to that effect.

If the passport possession judgment unit 304 determines that the user who wishes to pass through the gate apparatus 10 does not possess a correct passport, the passport possession judgment unit 304 does not perform any particular operation. That is, if the passport possession judgment unit 304 determines that the user who wishes to pass through the gate apparatus 10 does not possess a correct passport, the gate 318 does not open.

The nationality determination unit 305 is means for determining a nationality of users who wish to pass through the gate apparatus 10. Specifically, the nationality determination unit 305 determines whether a nationality of a user is Japanese or foreign based on the MRZ information acquired from the matching request unit 303. The nationality determination unit 305 notifies a determining result (Japanese or foreign) to the fingerprint authentication unit 306 and the gate control unit 307.

The fingerprint authentication unit 306 is means of performing authentication (fingerprint authentication) using a fingerprint of a user. Specifically, the fingerprint authentication unit 306 obtains the fingerprint of the user using the fingerprint scanner 317. The fingerprint authentication unit 306 does not perform any particular operation when the nationality of the user is "Japan". That is, the fingerprint authentication unit 306 does not obtain (collect) fingerprints if the user is Japanese.

In contrast, the fingerprint authentication unit 306 obtains a fingerprint of a user if a nationality of the user is "foreign country". For example, if the nationality of the user is other than Japanese, the fingerprint authentication unit 306 instructs the user to perform an operation of collecting the fingerprint. For example, the fingerprint authentication unit 306 displays a message on an LCD monitor or the like with contents shown in FIG. 9. The fingerprint authentication unit 306 controls the fingerprint scanner 317 to obtain fingerprint image. The fingerprint authentication unit 306 checks a quality (image quality) of the obtained fingerprint image and sets status to "fingerprint obtaining successful" if the quality meets the specified criteria. In contrast, the fingerprint authentication unit 306 sets the status to "fingerprint obtaining failure" if the obtained fingerprint image does not meet the specified criteria.

The above specified criteria can be, for example, a size of an area (effective area) in which ridges of a fingerprint are clearly visible. Alternatively, the obtained fingerprint image may be compared to a predetermined template image, and a degree of coincidence (similarity) may be set as the above specified criteria. Alternatively, a learning model obtained by machine learning may be used to determine fingerprint quality. For example, a number of fingerprint images that are judged by a fingerprint forensic scientist to meet criteria are collected, and a training model can be generated by using the fingerprint images labeled as teacher data. Any algorithm such as support vector machine, boosting or neural networks can be used to generate the training model. The above support vector machine and the like can use known techniques, therefore their description will be omitted. The fingerprint authentication unit 306 may input the obtained fingerprint image into the learning model and determine the quality of the fingerprint image according to its similarity to the labeled fingerprint image.

In the case of fingerprint obtaining failure, the fingerprint authentication unit 306 notifies a user that a fingerprint is to be reobtained and obtains the fingerprint. When a fingerprint that meets the specified criteria has been obtained (when the status is fingerprint obtaining success), the fingerprint authentication unit 306 executes an authentication process using the obtained fingerprint (fingerprint image).

For example, the fingerprint authentication unit 306 checks whether the obtained fingerprint does not correspond to criminal's fingerprints and determines "authentication success" when the obtained fingerprint does not correspond to criminal's fingerprints. That is, the fingerprint authentication unit 306 refers to a blacklist of fingerprint images of criminals and determines authentication success when the list does not include the obtained fingerprint image.

Alternatively, the fingerprint authentication unit 306 may determine authentication success when the obtained fingerprint image is included in pre-registered fingerprint images. That is, the fingerprint authentication unit 306 may refer to a whitelist and determine authentication success if the obtained fingerprint image is registered in the list.

Alternatively, the fingerprint authentication unit 306 may transmit the obtained fingerprint image to a fingerprint authentication server (not shown in FIG. 2, etc.). The fingerprint authentication server may perform a matching process (authentication process) using the blacklist or the whitelist described above and transmit a result to the gate apparatus 10.

Since an existing technique can be used for the authentication process (matching process) by the fingerprint authentication unit 306, detailed description of the extraction will be omitted. The fingerprint authentication unit 306 can calculate a score indicating a similarity of two fingerprint images and perform the authentication process based on the score. The above score is calculated based on position of each feature points in the fingerprint images and a number of core lines between feature points.

The fingerprint authentication unit 306 notifies the gate control unit 307 of a fingerprint authentication result (fingerprint authentication success or fingerprint authentication failure).

The gate control unit 307 is means for controlling the gate 318 of the gate apparatus 10.

When the nationality of the user is "Japan", the gate control unit 307 opens the gate 318 if the result of the passport possession judgment unit 304 is "correct passport possession".

In contrast, when the nationality of the user is "foreign country," the gate control unit 307 opens the gate 318 if the result of the passport possession judgment unit 304 is "correct passport possession" and the notification from the fingerprint authentication unit 306 is "fingerprint authentication success".

After the user who possesses the correct passport and who is permitted to pass through the gate 318 has passed through the gate 318, the gate control unit 307 closes the gate 318.

[Operation in Immigration Examination System]

Next, an operation in the immigration examination system according to the first example embodiment will be described.

Figure 10:
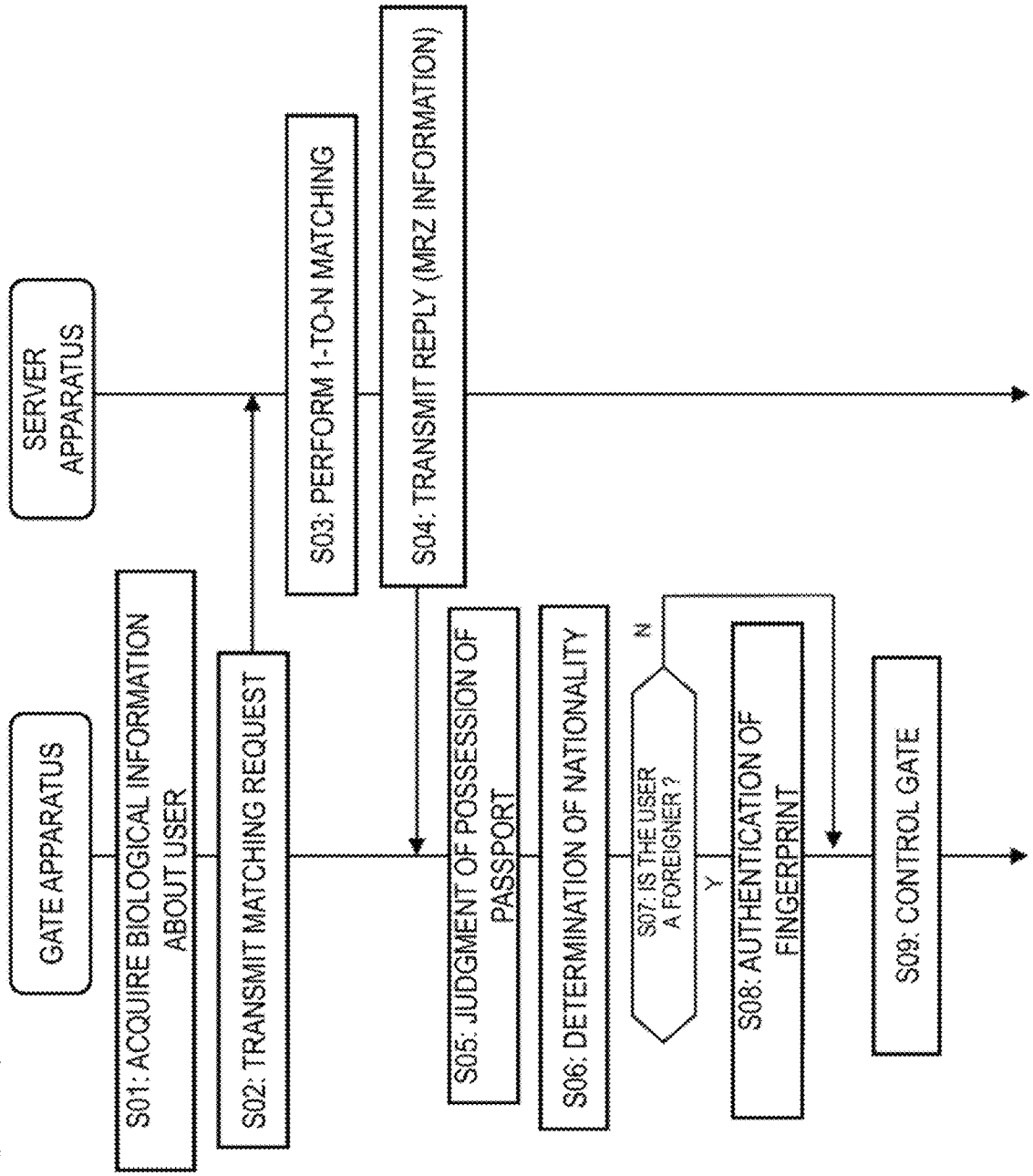
FIG. 10 is a sequence diagram illustrating an example of an operation in an emigration and immigration system according to the first example embodiment.

FIG. 10 is a sequence diagram illustrating an example of a system operation on the departure date of a user. FIG. 10 is a sequence diagram illustrating an example of a system operation on a user's boarding date. The following description assumes that, prior to this operation in FIG. 10, the "gate user information" about the user is previously registered in the server apparatus 20.

When a user approaches the gate apparatus 10, the gate apparatus 10 acquires biological information from the user (step S01). For example, the gate apparatus 10 acquires a face image of the user.

When the gate apparatus 10 successfully acquires a face image, the gate apparatus 10 transmits a matching request including the biological information about the user to the server apparatus 20 (step S02). Specifically, the gate apparatus 10 calculates a feature vector from the face image and transmits a matching request including the calculated feature vector to the server apparatus 20.

Upon acquiring the matching request, the server apparatus 20 extracts the biological information (the feature vector) from the matching request and performs 1-to-N matching between the feature vector and the biological information registered in the gate user database (step S03). The server apparatus 20 searches for biological information whose similarity to the biological information acquired from the gate apparatus 10 is the highest among a plurality of biological information registered in the gate user database.

The server apparatus 20 transmits a reply including the MRZ information determined as a result of the above 1-to-N matching to the gate apparatus 10 (the gate apparatus 10 that has transmitted the matching request) (step S04).

The gate apparatus 10 determines whether the user possesses a correct passport or not (step S05). Specifically, the gate apparatus 10 attempts to read out information from an IC chip in a passport held over the reader 316 by using the received MRZ information, and determines, if the information is read, that the user possesses a correct passport. If gate apparatus 10 fails to read out the information from the IC chip in the passport, the gate apparatus 10 determines that the user does not possess the correct passport.

The gate apparatus 10 determines the nationality of the user based on the MRZ information acquired from the server apparatus 20 (step S06).

If the user is a foreigner (if the nationality of the user is other than Japanese), the gate apparatus 10 performs fingerprint authentication using the fingerprint of the user (step S07, Yes branch; step S08). If the user is Japanese, the gate apparatus 10 does not perform any operation about fingerprint authentication.

Then, the gate apparatus 10 controls an opening and closing of the gate 318 (step S09). Specifically, if the user is Japanese, the gate apparatus 10 opens the gate 318 if it is confirmed that the user possesses the correct passport. In contrast, if the user is a foreigner, the gate apparatus 10 allows the user to pass through the gate 318 if the gate apparatus 10 succeeds in the fingerprint authentication using the fingerprint obtained from the user, in addition to possession of the correct passport.

As described above, in the immigration examination system according to the first example embodiment, a user who wishes to use the gate apparatus 10 registers biological information in the server apparatus 20 in advance. After the registration, when the user appears in front of the gate apparatus 10 on the departure date, the gate apparatus 10 acquires biological information about the user and queries the server apparatus 20 about whether the acquired biological information is registered in the server apparatus 20 (requests the server apparatus 20 to perform 1-to-N matching by using the biological information). As a result of the matching, if the gate apparatus 10 determines that the biological information about the user is registered in the server apparatus 20, the gate apparatus 10 determines whether the passport presented by the user is truly the passport of the user. Specifically, the gate apparatus 10 determines whether information can be read out from an IC chip in the passport of the user by using the MRZ information determined as a result of the face authentication by the server apparatus 20. Furthermore, the gate apparatus 10 determines the nationality of the user based on the MRZ information acquired. The gate apparatus 10 completes the immigration examination after successfully authenticating the fingerprint of the user concerned if the user is a foreign national in possession of the correct passport. On the other hand, the gate apparatus 10 completes the immigration examination on the condition that it has confirmed that the user has the correct passport if the user is Japanese. As a result, a single gate apparatus 10 can complete the immigration examination of the user regardless of the nationality of the user. That is, the immigration examination system according to the first example embodiment can realize, by a single face authentication automated gate, the immigration examination of foreigners who need to be fingerprinted (fingerprint authentication) and Japanese who do not need to be fingerprinted.

Second Example Embodiment

Next, a second example embodiment will be described in detail with reference to drawings.

The first example embodiment assumes that there is no inconsistency (incoherence) between biological information and MRZ information in gate user information registered in the server apparatus 20. When an officer of a public agency registers gate user information, it is hard to imagine that the above inconsistency occurs. However, when a user registers gate user information in the server apparatus 20, there is a slight possibility that the above inconsistency occurs. If the above inconsistency occurs, a correct immigration examination cannot be performed, thereby causing a problem. According to the second example embodiment, a more reliable immigration examination can be realized by causing a gate apparatus 10 to perform matching processing, too.

According to the second example embodiment, the immigration system may have the same schematic configuration and the server apparatus 20 may have the same processing configuration as those according to the first example embodiment. Thus, description corresponding to FIGS. 2, 3, etc. will be omitted. The following description will be made with a focus on the difference between the first and second example embodiments.

Figure 11:
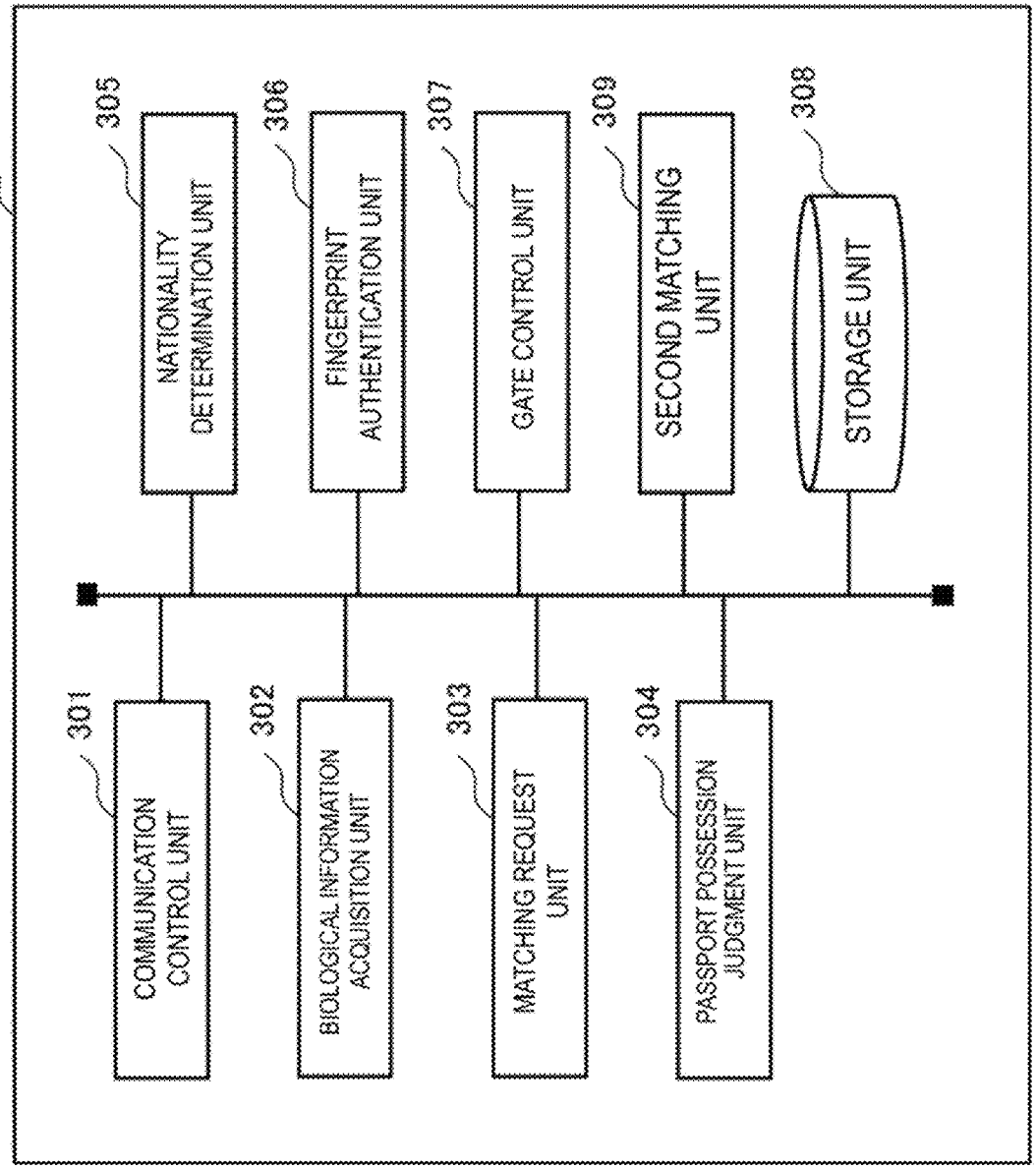
FIG. 11 is a diagram illustrating an example of a processing configuration of a gate apparatus according to a second example embodiment.

FIG. 11 is a diagram illustrating an example of a processing configuration (processing modules) of the gate apparatus 10 according to the second example embodiment. As illustrated in FIG. 11, the gate apparatus 10 includes a second matching unit 309 in addition to the components illustrated in FIG. 7.

The second matching unit 309 is means for performing matching (1-to-1 matching) to determine whether biological information about a user matches biological information read out from an IC chip in a passport that the user has brought into contact with the reader 316.

The biological information acquisition unit 302 stores acquired biological information (for example, a user's face image captured by the camera device 315) in the storage unit 308.

If the passport possession judgment unit 304 succeeds in reading out information from an IC chip by using MRZ information acquired from the server apparatus 20, the passport possession judgment unit 304 gives a face image included in the read information to the second matching unit 309.

The second matching unit 309 performs matching (1-to-1 matching) between the face image acquired from the passport possession judgment unit 304 and the face image stored in the storage unit 308. Specifically, the second matching unit 309 calculates a feature vector from each of the two images. Next, the second matching unit 309 calculates a similarity (for example, a Euclidean distance) between these two images and determines whether the two images indicate a face image of the same person, based on a result of threshold processing on the calculated similarity. For example, if the similarity is over a predetermined value (if the distance is shorter than a predetermined value), the second matching unit 309 determines that these two face images indicate the same person.

The second matching unit 309 determines that the user is in possession of the correct passport if the 1-to-1 matching is successful (if the facial image of the user in front of the own apparatus matches the facial image read from the IC chip in the passport presented).

In the second example embodiment, the nationality determination unit 305 may determine the nationality of a user based on the MRZ information or determine the nationality of the user based on information read from the IC chip. The IC chip in a passport records the name, the nationality, and other information of a passport holder.

In this way, if the gate apparatus 10 succeeds in the matching between the biological information acquired from the user and the biological information read out from the IC chip presented by the user, the gate apparatus 10 determines that the user is in possession of the correct passport. That is, if the gate apparatus 10 determines that the distance between the feature vectors obtained from the above two items of biological information is shorter than a predetermined distance and that the two items of biological information are substantially the same, the gate apparatus 10 determines that the user is in possession of the correct passport.

As described above, according to the second example embodiment, 1-to-1 matching between a face image of a user obtained from the camera device 315 attached to the gate apparatus 10 and a face image read out from an IC chip in a passport presented by the user is performed. As a result of this 1-to-1 matching, if the gate apparatus 10 succeeds in authenticating the user, the gate apparatus 10 determines that the user is in possession of the correct passport. That is, according to the first example embodiment, a problem is caused if there is an inconsistency in gate user information registered in the server apparatus 20. However, according to the second example embodiment, since the gate apparatus 10 performs final authentication processing on users, users who are not supposed to pass through the gate apparatus 10 are prevented from passing through the gate apparatus 10. According to the second example embodiment, after the server apparatus 20 performs 1-to-N matching, the gate apparatus 10 performs 1-to-1 matching. In this way, it is guaranteed that the users who pass through the gate apparatus 10 possess their correct passports (their own passports).

Variation

The configurations, operations, etc. of the immigration examination systems according to the above example embodiments have been described as examples, and the above description is not intended to limit the system configurations, etc.

For example, the functions of the server apparatus 20 may entirely or partially be realized by the gate apparatus 10. Alternatively, the gate user database of the server apparatus 20 may be established in a different database server.

In the above example embodiment, the case in which the gate apparatus 10 is used at the immigration examination is described. However, the gate apparatus 10 may also be used at the emigration examination. In the above example embodiment, the case in which the gate apparatus 10 installed in Japan does not collect fingerprints from Japanese is described. However, it is of course possible to apply the disclosure of the present application to the immigration examination in countries other than Japan. For example, the disclosure of the present application can be applied in cases where users of nationality A are exempted from fingerprinting and users of nationality B are required to be fingerprinting. That is, the disclosure of present application is applicable to cases where the contents of the examination (fingerprinting not required, fingerprinting required) changes depending on the nationality of the examination target user for emigration and immigration examination.

In the above example embodiments, transmission and reception of a feature vector calculated from a face image is performed between the gate apparatus 10 and the server apparatus 20. However, a face image may be transmitted from the gate apparatus 10 to the server apparatus 20. In this case, a matching request including a face image is transmitted from the gate apparatus 10 to the server apparatus 20, and the server apparatus 20 calculates a feature vector from the received face image and performs 1-to-N matching. Alternatively, a face image, not a feature vector, may be registered in the user information database of the server apparatus 20, and feature values may be calculated each time matching is performed.

The example embodiments assume that a single image includes a single face area. However, depending on the situation of the examination place, a single image could include a plurality of face areas. In this case, the gate apparatus 10 may extract a face area closest thereto and may transmit the corresponding biological information to the server apparatus 20. For example, the gate apparatus 10 may calculate the area of the individual face area and extract a face area having the largest area. Alternatively, for example, a depth camera that can measure the distance in the depth direction may be adopted as the camera device 315. In this case, the camera device 315 may measure the distance therefrom and may extract a face image of a person closest thereto.

In the above example embodiment, the gate apparatus 10 determines the nationality of the user from the MRZ information acquired from the server apparatus 20. However, the gate apparatus 10 may directly obtain the nationality of the user from the MRZ of the passport.

In the above example embodiment, operations of the gate apparatuses 10 and the server apparatus 20 have been described assuming that "faces" are mainly used as the biological information. However, the biological information that can be used in the present application is not limited to "faces". Other biological information such as irises may be used.

The data transmission and reception modes among the gate apparatuses 10 and the server apparatus 20 are not limited to any particular modes, and the data transmitted and received among these apparatuses may be encrypted. The face images and the feature values calculated from these face images are personal information, and to appropriately protect the personal information, it is desirable that encrypted data be transmitted and received.

The above example embodiments have been described based on a case where information is acquired from IC chips in passports by using MRZ information. However, the technique according to the present application is also applicable to other methods. That is, information corresponding to the MRZ information may be used to read out information from an IC chip mounted on a card or the like similar to a passport.

In the above example embodiment, the fingerprint authentication unit 306 acquires a fingerprint of the foreigner, and if the authentication using the acquired fingerprint is successful, the gate 318 is opened if the fingerprint is successfully authenticated using the acquired fingerprint. However, the gate apparatus 10 (fingerprint authentication section 306) can open the gate 318 on the condition that the fingerprint could be acquired from foreign nationals.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to immigration examination systems at airports.

A part or the entirety of the example embodiments described above may be described as in the following supplementary notes, but is not limited to the followings.

Supplementary Note 1

A gate apparatus, including:
a determination unit that determines a nationality of an examination target user;
a fingerprint authentication unit that obtains a fingerprint of the examination target user if the nationality of the examination target user is a first country, and performs fingerprint authentication using the obtained fingerprint; and
a gate control unit that controls a gate to allow the examination target user of a first nationality to pass through if the fingerprint authentication of the examination target user is successful.

Supplementary Note 2

The gate apparatus according to supplementary note 1, wherein the fingerprint authentication unit does not obtain the fingerprint of the examination target user whose nationality is a second country.

Supplementary Note 3

The gate apparatus according to supplementary note 2, wherein the determination unit determines the nationality of the examination target user based on MRZ (Machine Readable Zone) information in a machine-readable area of a passport.

Supplementary Note 4

The gate apparatus according to supplementary note 2, wherein the determination unit determines the nationality of the examination target user based on information read from an Integrated Circuit (IC) chip of a passport.

Supplementary Note 5

The gate apparatus according to any one of supplementary notes 2 to 4, further including:
an acquiring unit that acquires biological information of the examination target user;

a matching request unit that requests a server apparatus, which stores biological information of users and MRZ (Machine Readable Zone) information written in a machine-readable area of passports issued to the users in association with each other, to match the biological information of the examination target user; and a judgement unit that judges that the examination target user possesses a correct passport if information is successfully read from the Integrated Circuit (IC) chip of the passport using the MRZ information determined by the matching, wherein the gate control unit that controls the gate to allow the examination target user to pass through if the examination target user possesses the correct passport.

Supplementary Note 6

The gate apparatus according to supplementary note 5, wherein the gate control unit controls the gate to allow the examination target user to pass through if the matching between the biological information acquired from the examination target user and the biological information read out from the IC chip is successful.

Supplementary Note 7

The gate apparatus according to supplementary note 6, wherein the fingerprint authentication unit instructs the examination target user to perform an operation of collecting the fingerprint if the nationality of the examination target user is the first country.

Supplementary Note 8

The gate apparatus according to supplementary note 7, wherein, in the case that the first country is a country other than Japan, the gate control unit opens the gate if the examination target user possesses the correct passport and if the fingerprint authentication unit successfully authenticates the fingerprint of the examination target user.

Supplementary Note 9

The gate apparatus according to supplementary note 8, wherein, in the case that the second country is Japan, the gate control unit opens the gate if the examination target user possesses the correct passport.

Supplementary Note 10

The gate apparatus according to any one of supplementary notes 5 to 9, wherein the biological information is information about human face.

Supplementary Note 11

A gate apparatus control method, including:
determining a nationality of an examination target user;
obtaining a fingerprint of the examination target user if the nationality of the examination target user is a first country;
performing fingerprint authentication using the obtained fingerprint; and
controlling a gate to allow the examination target user of a first nationality to pass through if the fingerprint authentication of the examination target user is successful.

Supplementary Note 12

A computer-readable storage medium, storing a program that causes a computer mounted on a gate apparatus to perform processing for:
determining a nationality of an examination target user;
obtaining a fingerprint of the examination target user if the nationality of the examination target user is a first country;
performing fingerprint authentication using the obtained fingerprint; and
controlling a gate to allow the examination target user of a first nationality to pass through if the fingerprint authentication of the examination target user is successful.

The supplementary notes 11 and 12 can be expanded in the same way as the supplementary note 1 can be expanded into the supplementary note 2 to the supplementary note 10.

The entire disclosure of the above patent literature is incorporated herein by reference thereto. While the example embodiments of the present invention have thus been described, the present invention is not limited to these example embodiments. It is to be understood to those skilled in the art that these example embodiments are only examples and that various variations are possible without departing from the scope and sprit of the present invention. That is, the present invention of course includes various variations and modifications that could be made by those skilled in the art in accordance with the overall disclosure including the claims and the technical concept.

REFERENCE SIGNS LIST 10, 10-1 to 10-3, 100 gate apparatus
20 server apparatus
101 determination unit
102, 306 fingerprint authentication unit
103, 307 gate control unit
201, 301 communication control unit
202 user information registration unit
203 first matching unit
204, 308 storage unit
211, 311 processor
212, 312 memory
213 input-output interface
214, 314, communication interface
302 biological information acquisition unit
303 matching request unit
304 passport possession judgment unit
305 nationality determination unit
309 second matching unit
313 input-output device
315 camera device
316 reader
317 fingerprint scanner
318 gate

What is claimed is:
1. A gate apparatus comprising:
at least one processor; and
at least one memory storing a set of instructions executable by the processor to:
request a server apparatus to perform biometric authentication using biometric information of an examination target user;
determine a nationality of the examination target user by using information received from the server apparatus;

obtain a fingerprint of the examination target user if the nationality of the examination target user is a first country;
perform fingerprint authentication using the obtained fingerprint; and
control a gate to allow the examination target user of the first nationality to pass through if the fingerprint authentication of the examination target user is successful.

2. The gate apparatus according to claim 1, wherein the set of instructions is executable by the at least one processor to further:
not obtain the fingerprint of the examination target user if the national of the examination target user is a second country.

3. The gate apparatus according to claim 2, the set of instructions is executable by the at least one processor to further:
determine the nationality of the examination target user based on MRZ (Machine Readable Zone) information in a machine-readable area of a passport.

4. The gate apparatus according to claim 2, the set of instructions is executable by the at least one processor to further:
determine the nationality of the examination target user based on information read from an Integrated Circuit (IC) chip of a passport.

5. The gate apparatus according to claim 2, wherein the set of instructions is executable by the at least one processor to further:
acquire biological information of the examination target user;
request the server apparatus, which stores biological information of users and MRZ (Machine Readable Zone) information written in machine-readable areas of passports issued to the users in association with each other, to match the biological information of the examination target user;
judge that the examination target user possesses a correct passport if information is successfully read from an Integrated Circuit (IC) chip of the passport using the MRZ information determined by the matching; and
control the gate to allow the examination target user to pass through if the examination target user possesses the correct passport.

6. The gate apparatus according to claim 5, wherein the set of instructions is executable by the at least one processor to further:
control the gate to allow the examination target user to pass through if the matching between the biological information acquired from the examination target user and the biological information read from the IC chip is successful.

7. The gate apparatus according to claim 6, wherein the set of instructions is executable by the at least one processor to further:
instruct the examination target user to perform an operation so that the gate apparatus can collect the fingerprint of the examination target user if the nationality of the examination target user is the first country.

8. The gate apparatus according to claim 7, wherein, in a case that the first country is other than Japan,
the set of instructions is executable by the at least one processor to further:
open the gate if the examination target user possesses the correct passport and if the fingerprint authentication of the examination target user is successful.

9. The gate apparatus according to claim 8, wherein, in a case that the second country is Japan,
the set of instructions is executable by the at least one processor to further:
open the gate if the examination target user possesses the correct passport.

10. The gate apparatus according to claim 5, wherein the biological information is information about a human face.

11. The gate apparatus according to claim 5, wherein the set of instructions is executable by the at least one processor to further:
photograph a user; and
acquire the biometric information of the examination target user by extracting a face area from an image obtained by photographing the user, when a size of the face area included in the image is greater than a predetermined value.

12. A gate apparatus control method performed by a computer and comprising:
requesting a server apparatus to perform biometric authentication using biometric information of an examination target user;
determining a nationality of the examination target user by using information received from the server apparatus;
obtaining a fingerprint of the examination target user if the nationality of the examination target user is a first country;
performing fingerprint authentication using the obtained fingerprint; and
controlling a gate to allow the examination target user of the first nationality to pass through if the fingerprint authentication of the examination target user is successful.

13. A non-transitory computer-readable storage medium storing a program executable by a computer to perform processing comprising:
requesting a server apparatus to perform biometric authentication using biometric information of an examination target user;
determining a nationality of the examination target user by using information received from the server apparatus;
obtaining a fingerprint of the examination target user if the nationality of the examination target user is a first country;
performing fingerprint authentication using the obtained fingerprint; and
controlling a gate to allow the examination target user of the first nationality to pass through if the fingerprint authentication of the examination target user is successful.

* * * * *